(12) United States Patent
Nagayama et al.

(10) Patent No.: US 7,310,126 B2
(45) Date of Patent: Dec. 18, 2007

(54) REFLECTIVE LCD COMPRISING REFLECTIVE SURFACE INCLUDING CONVEX PORTIONS WHOSE ELEVATION VARYING CYCLES IS GREATER THAN PITCH OF CONVEX PORTIONS

(75) Inventors: Kohei Nagayama, Fukaya (JP); Yasuyuki Hanazawa, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 114 days.

(21) Appl. No.: 11/335,708

(22) Filed: Jan. 20, 2006

(65) Prior Publication Data

US 2006/0114379 A1 Jun. 1, 2006

Related U.S. Application Data

(62) Division of application No. 09/984,291, filed on Oct. 29, 2001.

(30) Foreign Application Priority Data

Oct. 31, 2000 (JP) ............................. 2000-333722
Apr. 9, 2001 (JP) ............................. 2001-110450

(51) Int. Cl.
*G02F 1/1335* (2006.01)
(52) U.S. Cl. ........................................ 349/114; 349/113
(58) Field of Classification Search ................ 349/113, 349/114
See application file for complete search history.

(56) References Cited

U.S. PATENT DOCUMENTS 5,691,791 A  *  11/1997  Nakamura et al. .......... 349/113
6,104,460 A      8/2000   Abe et al.
6,108,064 A      8/2000   Minoura et al.
6,181,396 B1     1/2001   Kanoh et al.
6,295,109 B1     9/2001   Kubo et al.
6,407,784 B1     6/2002   Kanou et al.
6,433,841 B1     8/2002   Murade et al.
6,452,653 B1     9/2002   Yamanaka et al.
6,747,718 B2 *   6/2004   Kanou et al. ................ 349/113
6,784,957 B2 *   8/2004   Kanou et al. ................ 349/113
2001/0010571 A1  8/2001   Kanou et al.

FOREIGN PATENT DOCUMENTS

JP      11-084375       3/1999
JP      11-295750       10/1999

\* cited by examiner

*Primary Examiner*—Toan Ton
(74) *Attorney, Agent, or Firm*—Pillsbury Winthrop Shaw Pittman, LLP

(57) ABSTRACT

There is disclosed a liquid crystal display device comprising an array substrate, an counter substrate, and a liquid crystal layer which is held between the array substrate and the counter substrate and whose liquid crystal molecular arrangement is divided into a plurality of pixel areas controlled by the array substrate and opposite substrate. The array substrate includes a reflective pixel electrode for scattering a light incident via the counter substrate and liquid crystal layer. The reflective pixel electrode has a reflective surface in which a first undulation having a gradual inclined surface disposed in each pixel area and a second undulation having a plurality of convex portions as main scattering portions disposed in each pixel area are superimposed.

8 Claims, 10 Drawing Sheets

F I G. 4A
F I G. 4B
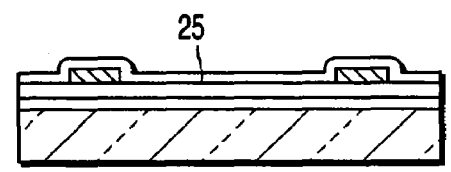
F I G. 4C
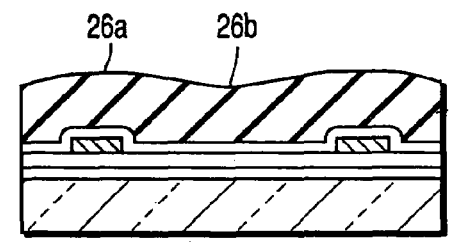
F I G. 4D
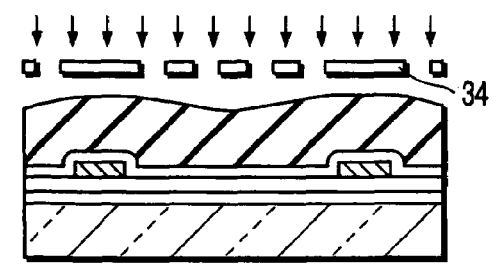
F I G. 4E
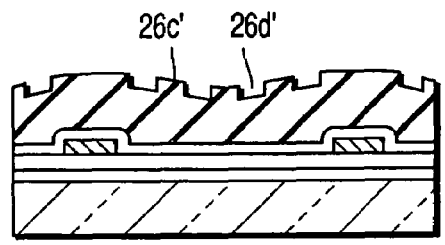
F I G. 4F
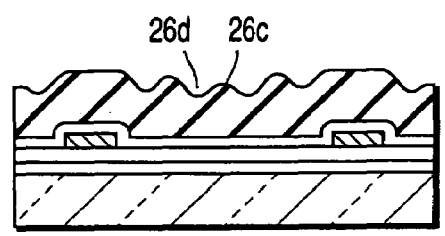
F I G. 4G
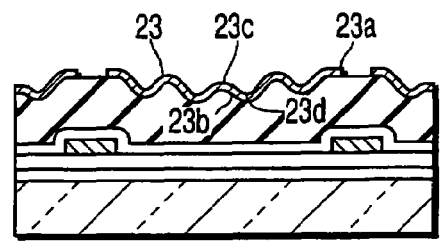
F I G. 4H

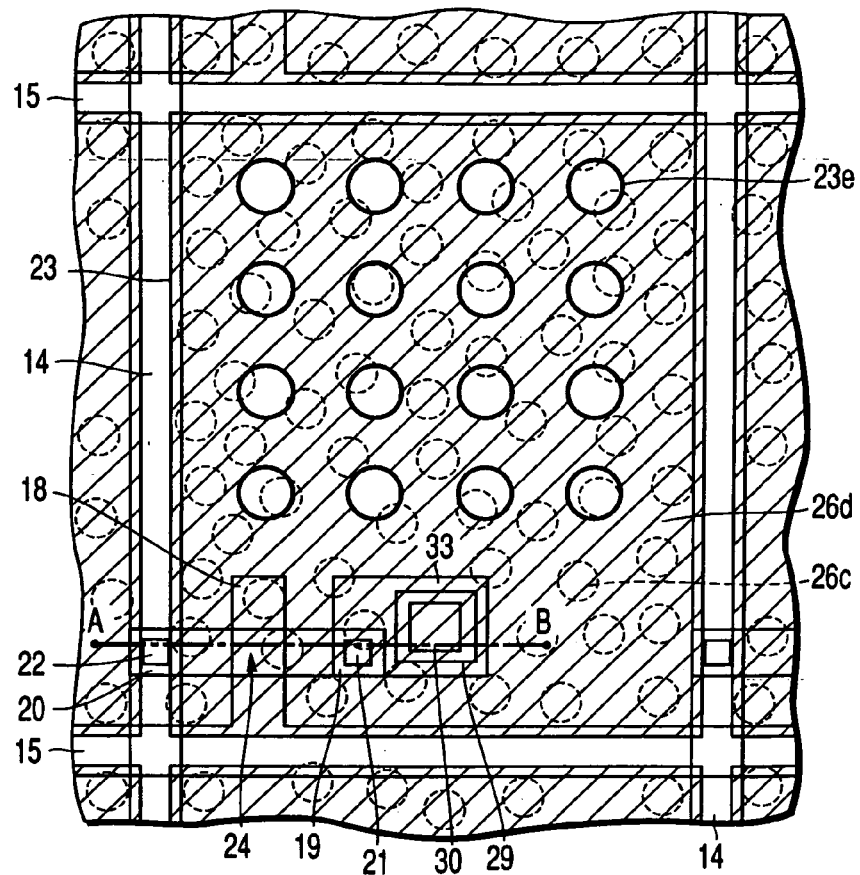
F I G. 12
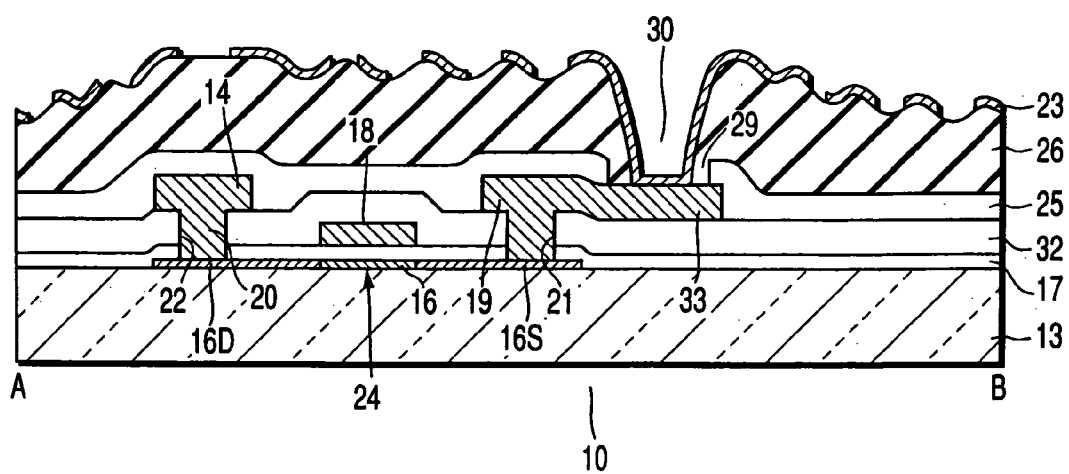
F I G. 13

REFLECTIVE LCD COMPRISING REFLECTIVE SURFACE INCLUDING CONVEX PORTIONS WHOSE ELEVATION VARYING CYCLES IS GREATER THAN PITCH OF CONVEX PORTIONS

CROSS-REFERENCE TO RELATED APPLICATIONS

This application is a divisional of co-pending U.S. application Ser. No. 09/984,291, filed Oct. 29, 2001, and for which priority is claimed under 35 U.S.C. §121. This application is based upon and claims the benefit of priority under 35 U.S.C. §119 from the prior Japanese Patent Applications No. 2000-333722, filed Oct. 31, 2000; and No. 2001-110450, filed Apr. 9, 2001, the entire contents of all applications are incorporated herein by reference in their entireties.

BACKGROUND OF THE INVENTION

1. Field of the Invention

The present invention relates to a liquid crystal display device, particularly to a reflective liquid crystal display device having a reflection function, and a semi-transmission type liquid crystal display device having a reflection function and transmission function.

2. Description of the Related Art

In recent years, a liquid crystal display device has been applied to various apparatuses such as a personal computer, television, word processor, and mobile phone. An application range of the liquid crystal display device has been broadened, whereas a demand for enhanced functions such as a small size, power saving, and low cost is increasing. To satisfy this demand, development of a reflective liquid crystal display device has been advanced. Since the reflective liquid crystal display device uses an external light to display an image, an internal light source such as a back light unit is not required.

In the reflective liquid crystal display device, the external light is reflected by a reflective plate and optically modulated by a liquid crystal layer so that the image is displayed. A brightness of the external light depends on an installation environment of the liquid crystal display device, and is not stable as in a back light. Therefore, to prevent a light intensity of the external light from being attenuated as much as possible is important for display of a bright image. Particularly, a reflection property of the reflective plate largely influences the attenuation of the light intensity. Therefore, optimization is attempted in order to obtain the reflection property for efficiently reflecting the external light incident at any angle.

As one example of the optimization, it is proposed to dispose an undulation on a reflective surface of the reflective plate as shown in FIG. 10. That is, the undulation of the reflective surface controls scattering of a reflected light so as to concentrate the reflected light in a certain range of area, and raise a reflected light intensity with respect to a specific observation direction.

In actual manufacturing, the reflective surface having the aforementioned undulation is obtained by disposing the reflective plate on a main scattering portion including a plurality of irregularly arranged circular protrusions. The reflection property of the reflective plate is substantially optimum, when a diameter d of the protrusion is set to a range of 3 to 20 µm, and a height H of the protrusion is set to a range of 0.6 to 1.2 µm. However, when the undulation of the reflective surface, that is, a difference of elevation exceeds 1 µm by the aforementioned structure with respect to a small lateral width of about 10 µm, this induces an alignment defect of a liquid crystal, and an image contrast is deteriorated.

As a countermeasure, if the difference of elevation of the reflective surface is limited to about 0.5 µm with respect to the aforementioned lateral width, the deterioration of an image quality can be avoided. However, when such countermeasure is taken, an inclination angle of the reflective surface decreases. Therefore, the reflected light intensity in the vicinity of regular reflection relatively increases. As a result, a range of an angle of a field of view in which a sufficient reflected light intensity is obtained is narrowed. That is, this countermeasure is not practical because the reflection property of the reflective plate is not optimized.

BRIEF SUMMARY OF THE INVENTION

The present invention has been developed in consideration of the aforementioned problem, and an object thereof is to provide a liquid crystal display device which can prevent an alignment defect of a liquid crystal without deteriorating a satisfactory optical property and which has a high contrast and a satisfactory display quality level.

To solve the problem and achieve the object, there is provided a liquid crystal display device comprising: first and second electrode substrates; and a liquid crystal layer which is held between the first and second electrode substrates and whose liquid crystal molecular arrangement is divided into a plurality of pixel areas controlled by the first and second electrode substrates, wherein the first electrode substrate includes a reflective plate for scattering a light incident via the second electrode substrate and the liquid crystal layer, and the reflective plate has a reflective surface in which a first undulation formed by disposing a gradual inclined surface in each pixel area and a second undulation formed by disposing a plurality of main scattering portions in each pixel area are superimposed.

Moreover, there is provided a liquid crystal display device comprising: first and second electrode substrates; and a liquid crystal layer which is held between the first and second electrode substrates and whose liquid crystal molecular arrangement is divided into a plurality of pixel areas controlled by the first and second electrode substrates, wherein the first electrode substrate includes an area in which a reflective plate for scattering a light incident via the second electrode substrate and the liquid crystal layer is formed and which has a reflection function, and an area having a transmission function for transmitting the light incident via the first electrode substrate, and the reflective plate has a reflective surface in which a first undulation formed by disposing a gradual inclined surface in each pixel area and a second undulation formed by disposing a plurality of main scattering portions in each pixel area are superimposed.

In the liquid crystal display device, the reflective plate has the reflective surface in which the first undulation formed by disposing the gradual inclined surface in each pixel area and the second undulation formed by disposing the plurality of main scattering portions in each pixel area are superimposed. That is, the main scattering portion of the second undulation controls scattering of the reflected light on the gradual inclined surface obtained by the first undulation with respect to each pixel area.

In this case, even when a difference of elevation of the second undulation is limited with respect to a micro lateral width, an inclination angle of the reflective surface is not reduced, and a reflection property of the reflective plate can be maintained to be optimum by superimposition of the first and second undulations. In other words, an alignment defect of a liquid crystal can be prevented without deteriorating a satisfactory optical property, that is, reflection property. As a result, the liquid crystal display device can display a high-quality image which has a broad angle of field of view and a high contrast.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 4A to 4H are diagrams showing manufacturing steps of an array substrate shown in FIG. 1.

FIG. 12 is a diagram showing the plane structure in the vicinity of the pixel shown in FIG. 11.

FIG. 13 shows a sectional structure taken along line A-B shown in FIG. 12.

DETAILED DESCRIPTION OF THE INVENTION

A liquid crystal display device according to one embodiment of the present invention will be described hereinafter with reference to the drawings.

Figure 1:
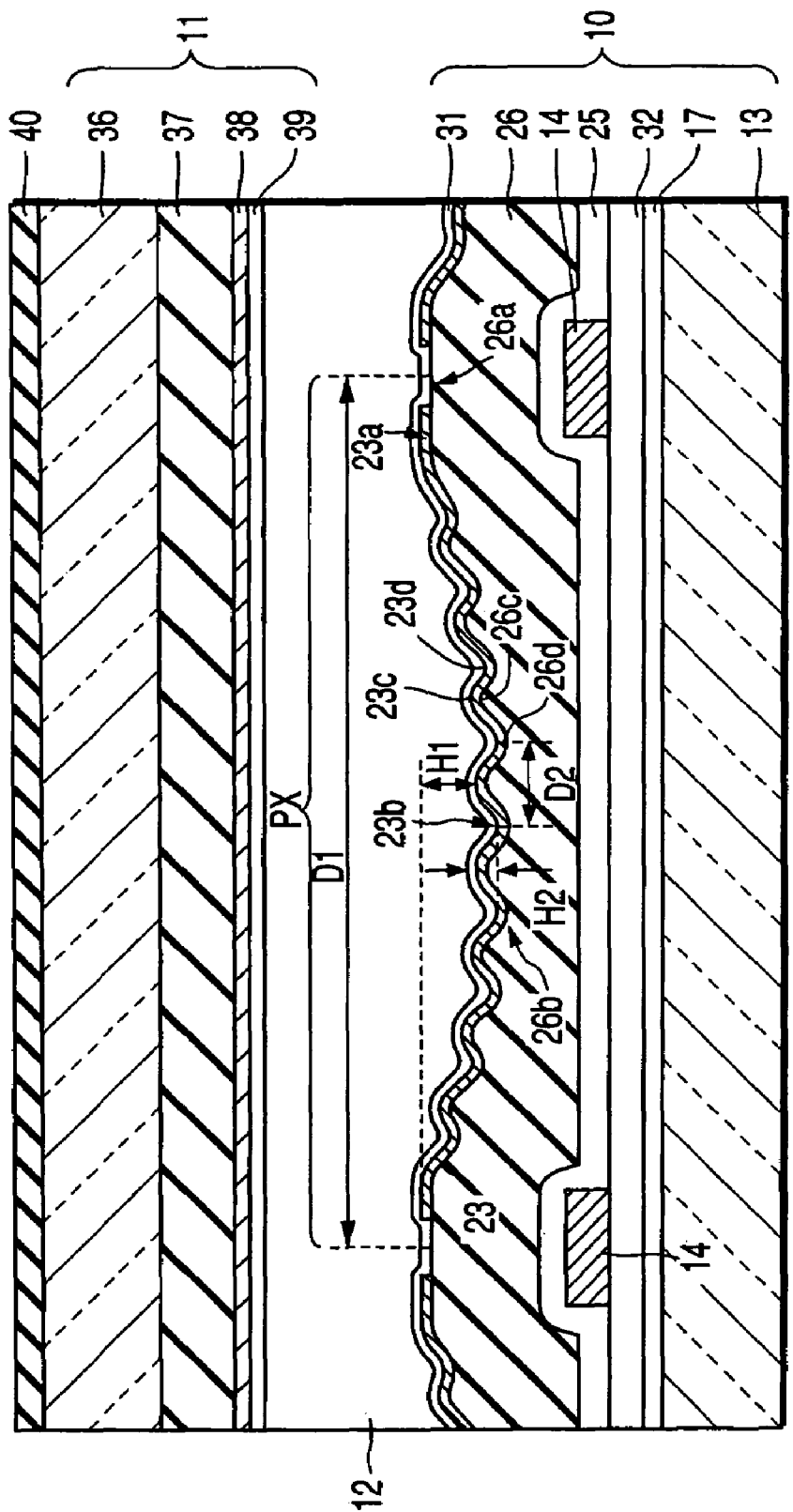
FIG. 1 is a diagram showing a sectional structure in the vicinity of a pixel of a reflective liquid crystal display device according to a first embodiment of the present invention.
Figure 2:
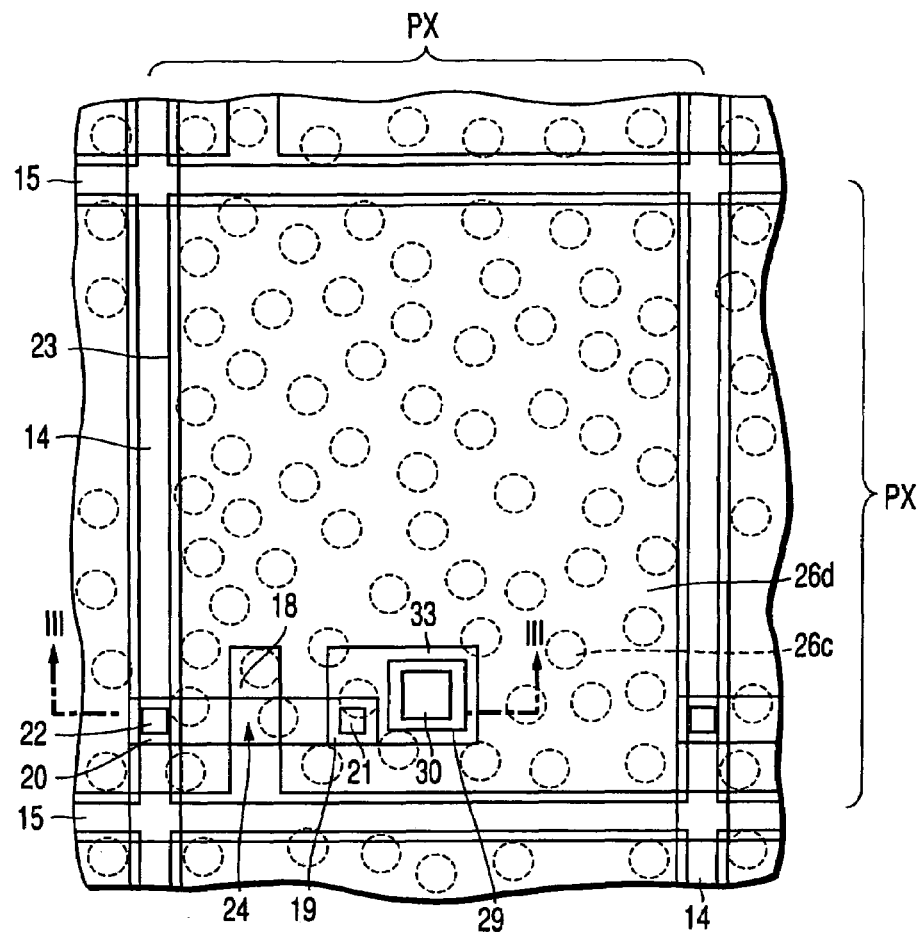
FIG. 2 is a diagram showing a plane structure in the vicinity of the pixel shown in FIG. 1.
Figure 3:
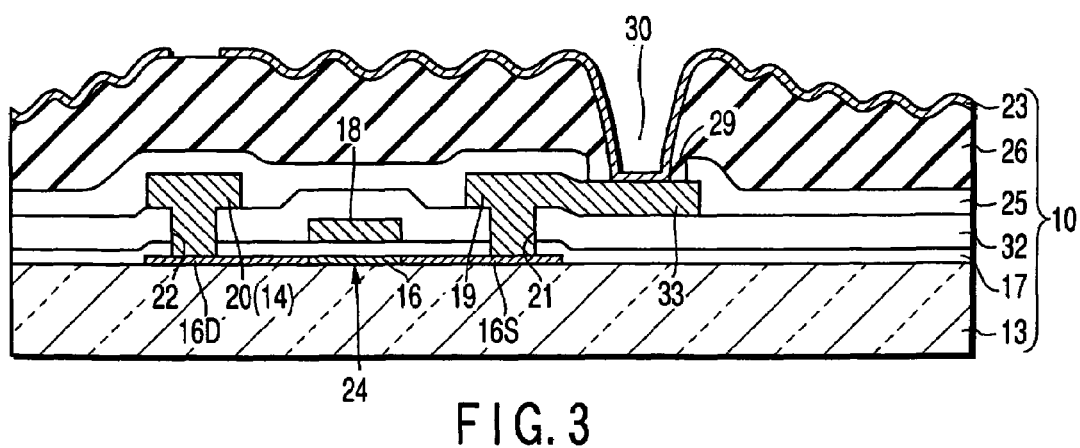
FIG. 3 shows a sectional structure taken along line III-III shown in FIG. 2.

FIG. 1 shows a sectional structure in the vicinity of a pixel of a reflective liquid crystal display device according to a first embodiment of the liquid crystal display device, FIG. 2 shows a plane structure in the vicinity of the pixel of the reflective liquid crystal display device, and FIG. 3 shows a sectional structure taken along line III-III shown in FIG. 2. The liquid crystal display device includes an array substrate 10, an counter substrate 11, and a liquid crystal layer 12 held between these substrates 10 and 11.

The array substrate 10 includes an insulating substrate 13, a plurality of reflective pixel electrodes 23 arranged in a matrix form, a plurality of signal lines 14 arranged along a row of these reflective pixel electrodes 23, a plurality of scanning lines 15 arranged along a line of these reflective pixel electrodes 23, a plurality of thin film transistors for pixels (TFT) 24 arranged as switching elements in the vicinity of intersection positions of the corresponding scanning line 15 and signal line 14, and an alignment film 31 with which the plurality of reflective pixel electrodes 23 are coated.

The counter substrate 11 includes an insulating substrate 36 having permeability to light, a coloring layer 37 forming a color filter with which the insulating substrate 36 is coated, a transparent counter electrode 38 with which the coloring layer 37 is coated, and an alignment film 39 with which the counter electrode 38 is coated. Moreover, a polarization plate 40 is attached to the transparent insulating substrate 36 on a side opposite to the coloring layer 37.

The liquid crystal layer 12 is divided into a plurality of pixel areas PX for the plurality of reflective pixel electrodes 23. Each pixel area PX is disposed between two adjacent scanning lines 15 and two adjacent signal lines 14. Each thin film transistor 24 becomes conductive in response to a scanning pulse supplied from the corresponding scanning line 15, and supplies a potential of the corresponding signal line 14 to the corresponding reflective pixel electrode 23. Each reflective pixel electrode 23 applies the potential of the corresponding signal line 14 as a pixel potential to the corresponding pixel area PX of the liquid crystal layer 12, and controls a transmittance of the pixel area PX based on a difference between the pixel potential and the potential of the counter electrode 38.

In the array substrate 10, each TFT 24 includes a semiconductor layer 16 of amorphous silicon or polysilicon, a gate electrode 18 formed above the semiconductor layer 16 in an insulated manner and connected to the corresponding scanning line 15, and source and drain electrodes 19, 20 which contact a source area 16S and drain area 16D of the semiconductor layer 16 via contact holes 21, 22 on opposite sides of the gate electrode 18 and which are connected to the corresponding reflective pixel electrode 23 and corresponding signal line 14, respectively.

The semiconductor layer 16 is formed on the insulating substrate 13, and coated with a gate insulating film 17 together with the insulating substrate 13. The gate electrode 18 is insulated from the semiconductor layer 16 by the gate insulating film 17, and integrally formed with the corresponding scanning line 15 on the gate insulating film 17. The gate electrode 18 and scanning line 15 as well as the gate insulating film 17 are coated with an interlayer insulating film 32.

The contact holes 21, 22 are formed in the interlayer insulating film 32 and gate insulating film 17 so that the source area 16S and drain area 16D formed in the semiconductor layer 16 are exposed on the opposite sides of the gate electrode 18. The source electrode 19 and drain electrode 20 are in contact with the source area 16S and drain area 16D of the semiconductor layer 16 in these contact holes 21, 22, respectively, and formed on the interlayer insulating film 32.

The source electrode 19 is integrally formed with an expansion source electrode 33 on the interlayer insulating film 32. The drain electrode 20 is integrally formed with the corresponding signal line 14 on the interlayer insulating film 32. The source electrode 19, expansion source electrode 33, drain electrode 20, and signal line 14, together with the interlayer insulating film 32, are coated with a protective insulating film 25.

The protective insulating film 25 has a contact hole 29 in which the expansion source electrode 33 is partially exposed, and is coated with an organic insulating film 26. The organic insulating film 26 has a contact hole 30 in which the expansion source electrode 33 is partially exposed, and the contact hole 30 is formed in the contact hole 29 of the protective insulating film 25. The reflective pixel electrode 23 contacts the expansion source electrode 33 in the contact holes 29, 30, and is formed on the organic insulating film 26 and coated with the alignment film 31.

The organic insulating film 26 has an upper surface in which a first molding undulation gradually depressed toward the vicinity of a middle from an outer edge in a range of each pixel area PX and a second molding undulation rising in a plurality of positions in the range of the pixel area PX are superimposed. That is, the first molding undulation is a gradual inclined surface, and is constituted of a convex portion 26a arranged along the outer edge in the range of the pixel area PX, and a concave portion 26b surrounded by the convex portion 26a. The second molding undulation is constituted of a plurality of hemispheric convex portions 26c arranged at random in the range of the pixel area PX, and concave portions 26d surrounding these convex portions 26c.

The reflective pixel electrode 23 functions as a reflective plate for scattering a light incident from the counter substrate 11 via the liquid crystal layer 12 at a high reflectance, contains materials such as silver, aluminum, and an alloy of these, and is formed in a predetermined thickness along the upper surface of the organic insulating film 26. Therefore, the reflective pixel electrode 23 is formed on the upper surface of the organic insulating film 26, and is defined to have a reflective surface in which a first undulation formed by disposing the gradual inclined surface in the range of the pixel area PX and a second undulation formed by disposing a plurality of main scattering portions in the range of the pixel area PX are superimposed.

That is, the first undulation of the reflective pixel electrode 23 is constituted of a concave portion 23b corresponding to the concave portion 26b of the organic insulating film 26, and a convex portion 23a corresponding to the convex portion 26a of the organic insulating film 26. The second undulation of the reflective pixel electrode 23 is constituted of a convex portion 23c corresponding to the convex portion 26c of the organic insulating film 26, and a concave portion 23d corresponding to the concave portion 26d of the organic insulating film 26. The gradual inclined surface of the first undulation is obtained as a combination of the convex portion 23a and concave portion 23b. The main scattering portion of the second undulation is obtained as the randomly disposed convex portion 23c or concave portion 23d. In FIG. 1, H1 indicates a difference of elevation of the first undulation as a height of the convex portion 23a or a depth of the concave portion 23b, and H2 indicates a difference of elevation of the second undulation as a height of the convex portion 23c or a depth of the concave portion 23d.

Manufacturing steps of the aforementioned reflective liquid crystal display device will next be described.

FIGS. 4A to 4H show the manufacturing steps of the array substrate 10. In manufacturing of the array substrate 10, first the semiconductor layer 16 is formed on the insulating substrate 13 of a glass plate, quartz plate, or the like. The semiconductor layer 16 is formed by depositing, for example, amorphous silicon on the insulating substrate 13 in a thickness of about 50 nm by a CVD process, and patterning this layer by a photo-etching process.

Subsequently, the gate insulating film 17 is formed by depositing SiOx on the semiconductor layer 16 and insulating substrate 13 in a thickness of the order of 100 nm to 150 nm by the CVD process.

Subsequently, the gate electrode 18 and scanning line 15 are integrally formed by depositing a single metal such as Ta, Cr, Al, Mo, W, and Cu, or a deposited or alloy film of the metals on the gate insulating film 17 in a thickness of the order of 200 nm to 400 nm, and patterning the film by the photo-etching process. Thereafter, an impurity such as phosphorus is injected into the semiconductor layer 16 by an ion injecting or doping process using the gate electrode 18 as a mask. Here, phosphorus is accelerated, for example, at an acceleration voltage of 80 keV in an atmosphere of $PH_3/H_2$, and injected at a dosage of $5 \times 10^{15}$ atoms/cm$^2$, that is, at a high concentration. The impurity injected area is activated by annealing the semiconductor layer 16, and constitutes a source and drain of the thin film transistor 24.

In the step shown in FIG. 4A, the interlayer insulating film 32 is formed by using, for example, a PECVD process to deposit SiOx on the gate electrode 18, scanning line 15, and gate oxide film 17 in a thickness of the order of 500 nm to 700 nm. Thereafter, the interlayer insulating film 32 is patterned by the photo-etching process so that the source and drain of the semiconductor layer 16 are exposed, and thereby the contact holes 21 and 22 are formed.

In the step shown in FIG. 4B, the single metal such as Ta, Cr, Al, Mo, W, and Cu, or the laminated or alloy film of the metals is deposited on the interlayer insulating film 32 in a thickness of the order of 500 nm to 700 nm, and patterned into a predetermined shape by the photo-etching process, so that wirings such as the signal line 14, source electrode 19, expansion source electrode 33, and scanning line 15 are formed.

In the step shown in FIG. 4C, the protective insulating film 25 is formed by depositing SiNx on these wirings and interlayer insulating film 32 by the PECVD process. Thereafter, the contact hole 29 is formed by patterning the protective insulating film 25 by the photo-etching process.

In the step shown in FIG. 4D, the organic insulating film 26 is formed by applying a positive photosensitive resin on the protective insulating film 25 in a thickness of the order of 1 μm to 4 μm by a spin coating process or the like, and further pre-baking the whole array substrate 10. When a viscosity and spin rotation number of the photosensitive resin are optimized, the first molding undulation of the convex portion 26a and concave portion 26b can be formed in the pixel area PX surrounded by the two adjacent signal lines 14 and two adjacent scanning lines 15. Concretely, the difference of elevation of the order of 0.1 µm to 0.5 µm is generated in the upper surface of the organic insulating film 26 depending upon the thickness of the wiring materials such as the scanning line 15 and signal line 14. The convex portion 26a is disposed in the outer edge of each pixel area PX, that is, in a boundary with the adjacent pixel area, and the concave portion 26b is disposed to be surrounded by the convex portion 26a. Therefore, a dimension D1 of the concave portion 26b substantially agrees with a pixel pitch usually of the order of 20 µm to 400 µm.

In the step shown in FIG. 4E, a first photo mask is used to partially expose the organic insulating film 26 in a range corresponding to the contact hole 29. An opening is made in the organic insulating film 26 in order to form the contact hole 30 in which the expansion source electrode 33 is exposed. Therefore, a exposure i is preferably of the order of 200 mJ to 1000 mJ.

Subsequently, a second photo mask 34 is used to expose the organic insulating film 26 in the range of the pixel area PX. The second photo mask has a circular shielding portion disposed at random such that the portion is prevented from overlapping with the signal line 14 and scanning line 15. Here, a diameter of the shielding portion is set to be of the order of 2 µm to 20 µm, which is smaller than the dimension D1 of the concave portion 26b, and the exposure is set to a range of 10 mJ to 200 mJ. The undulation of the organic insulating film 26, that is, a concave/convex shape and density can be controlled in accordance with an opening shape, the opening density of the photo mask 34, exposure, and the like.

In the step shown in FIG. 4F, the organic insulating film 26 is developed in order to remove the aforementioned exposed portion, and thereby a plurality of convex portions 26c' and concave portions 26d' are formed in the organic insulating film 26 together with the contact hole 30. Additionally, in the exposure using the second photo mask 34, the exposure is in the range of 10 to 200 mJ. Therefore, a bottom of the concave portion 26d' does not reach the protective insulating film 25 as a substrate of the organic insulating film 26, and remains in the vicinity of the upper surface of the organic insulating film 26.

In the step shown in FIG. 4G, a heating treatment of the array substrate 10 is performed. This changes the convex portion 26c' and concave portion 26d' of the organic insulating film 26 to the chamfered smoothly hemispheric convex portion 26c and the concave portion 26d surrounding the convex portion 26c, and the second molding undulation is formed. A diameter D2 of the convex portion 26c is set to be smaller than the dimension D1 of the concave portion 26b in accordance with the diameter of the shielding portion.

In the step shown in FIG. 4H, a metal film of Al, Ni, Cr, Ag or the like is deposited on the organic insulating film 26 in a thickness of about 100 nm by a sputtering process, and patterned in a predetermined shape in the photo-etching process, and thereby the reflective pixel electrode 23 is formed.

In the manufacturing of the counter substrate 11, the glass plate, quartz plate, or the like is used as the insulating substrate 36 permeable to light, and the coloring layer 37 with a pigment, and the like dispersed therein is formed on the insulating substrate 36. The transparent counter electrode 38 is formed by depositing, for example, ITO on the coloring layer 37 by the sputtering process.

The array substrate 10 and counter substrate 11 are integrally formed after the alignment films 31 and 39 are formed. The alignment film 31 is formed by applying low-temperature cure type polyimide by printing so that the reflective pixel electrode 23 and organic insulating film 26 are coated, and performing a rubbing treatment. Moreover, the alignment film 39 is formed by applying low-temperature cure type polyimide by printing so that the transparent counter electrode 38 is coated, and performing a rubbing treatment.

The array substrate 10 and counter substrate 11 are obtained as described above, and disposed opposite to each other, while the alignment films 31 and 39 are disposed inside. These substrates are attached to each other via a peripheral edge seal material at a predetermined interval. The liquid crystal layer 12 is obtained by forming a liquid crystal injected space surrounded by the peripheral edge seal material into a cell between the array substrate 10 and the counter substrate 11, and injecting and sealing a liquid crystal composition such as a nematic liquid crystal into the cell. The polarization plate 40 is attached to the transparent insulating substrate 36 on the side opposite to the coloring layer 37. The reflective liquid crystal display device is completed as described above.

In the liquid crystal display device according to the first embodiment, the reflective pixel electrode 23 constitutes the reflective plate, and the reflective surface has a state in which the first undulation having the difference of elevation H1 and the second undulation having the difference of elevation H2 are superimposed. The first undulation is constituted of the convex portion 23a disposed along the outer edge in the range of the pixel area PX, and the concave portion 23b surrounded by the convex portion 23a The second undulation is constituted of the plurality of hemispheric convex portions 23c arranged at random in the range of the pixel area PX, and the concave portions 23d surrounding these convex portions 23c.

That is, the first undulation is gradually depressed toward the vicinity of the middle from the outer edge in the range of each pixel area PX, and is is formed by disposing the gradual inclined surface in each pixel area PX. Moreover, the second undulation rises in the plurality of positions in the range of the pixel area PX, and is formed by disposing the plurality of main scattering portions in each pixel area PX.

A reflected light on the reflective surface is scattered by an inclination angle obtained by superimposing an inclination angle obtained by the second undulation upon the inclination angle obtained by the first undulation. Therefore, even when the inclination angle obtained by the second undulation is small, an optimum reflection property can be obtained. On the other hand, the difference of elevation in a micro range can be set to a value sufficiently smaller than a conventional value, such as H2. Therefore, a liquid crystal alignment defect attributed to the difference of elevation can be prevented. As a result, the reflective liquid crystal display device can display a high-quality image having a broad angle of field of view and high contrast.

In the first embodiment, the second undulation is disposed in a position excluding a space between the reflective pixel electrodes 23. This does not substantially cause deterioration of a reflection property of the reflective surface, and additionally the second molding undulation on the side of the organic insulating film 26 can be obviated in the range of the space. Therefore, a patterning defect is not generated during patterning of the metal film deposited using the organic insulating film 26 as the substrate in the step of forming the reflective pixel electrode 23, and a point defect by a short-circuit between the pixel electrodes 23 can be reduced. Moreover, the second molding undulation is disposed so that the undulation is prevented from overlapping with the scanning line 15 and signal line 14. Therefore, a parasitic capacity between the scanning line 15 and the pixel electrode 23 and between the signal line 14 and the pixel electrode 23 can be reduced. Therefore, a display quality can be prevented from being deteriorated by cross talk, or the like.

Figure 5:
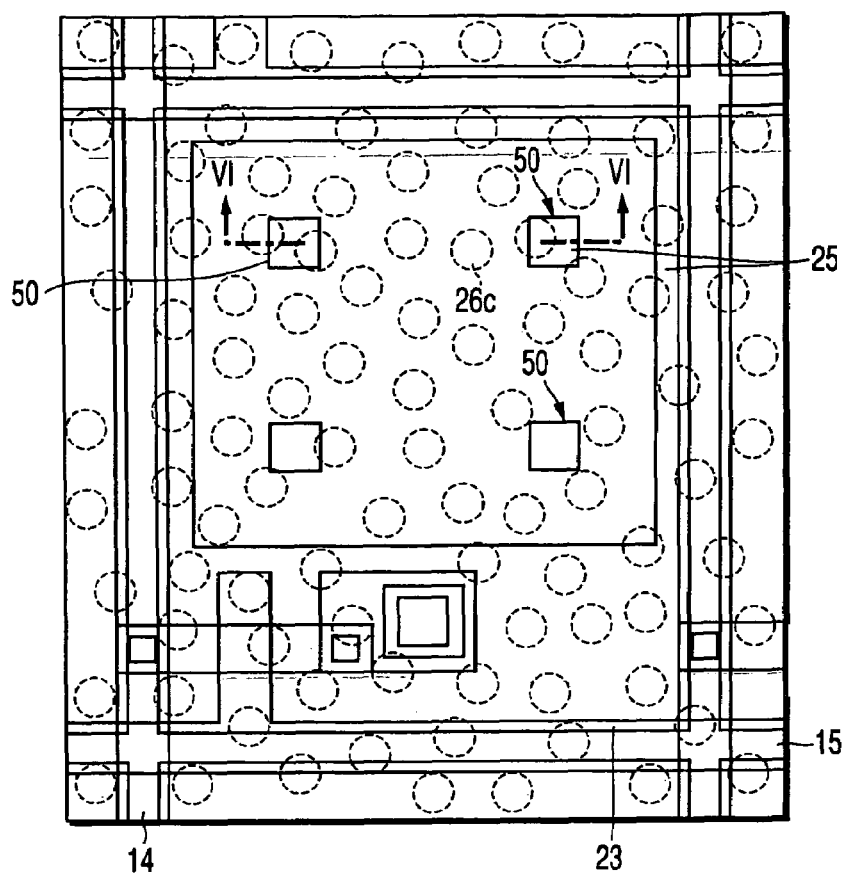
FIG. 5 is a diagram showing the plane structure in the vicinity of the pixel of the reflective liquid crystal display device according to a second embodiment of the present invention.
Figure 6:
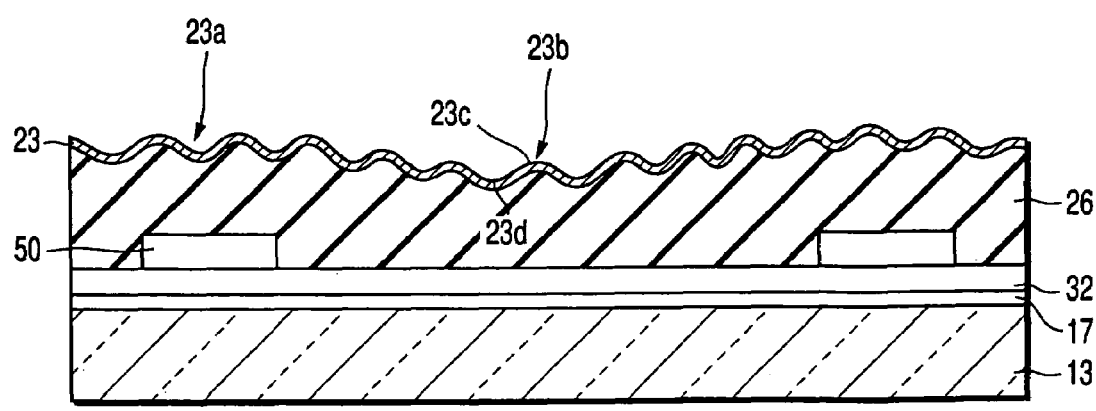
FIG. 6 is a diagram showing a sectional structure taken along line VI-VI shown in FIG. 5.

The reflective liquid crystal display device according to a second embodiment of the present invention will next be described. FIG. 5 shows the plane structure in the vicinity of the pixel of the reflective liquid crystal display device, and FIG. 6 shows a sectional structure taken along line VI-VI shown in FIG. 5. The liquid crystal display device is constituted similarly as the first embodiment except the following structure. Therefore, in FIGS. 5 and 6, a part similar to that of the first embodiment is denoted with the same reference numeral, and the description thereof is omitted.

As shown in FIG. 5, in this liquid crystal display device, the protective insulating film 25 is selectively removed so that the interlayer insulating film 32 is exposed and a plurality of island portions 50 are left in an area corresponding to the reflective pixel electrode 23, and the organic insulating film 26 is formed using the protective insulating film 25 and interlayer insulating film 32 as substrates. This island portion 50 is disposed inside the outer edge of each pixel area. In this case, the first molding undulation is obtained in the upper surface of the organic insulating film 26 depending upon the aforementioned constitution, and the reflective pixel electrode 23 is formed along the upper surface.

Thereby, the inclination angle of the first undulation of the reflective pixel electrode 23 is formed depending upon the thickness of the plurality of island portions. Moreover, the reflective undulation of the reflective pixel electrode 23 is obtained in which the plurality of main scattering portions, that is, convex portions 23c are disposed in the gradual inclined surface as shown in FIG. 6. The reflective pixel electrode 23 is formed along the upper surface as shown in FIG. 6.

Similarly as the first embodiment, in the reflective liquid crystal display device of the second embodiment, the alignment defect of liquid crystal can be prevented without deteriorating a satisfactory optical reflection property. Moreover, an interval of the island portions 50 can arbitrarily be changed. Therefore, even with a large pixel pitch, a situation in which the optical reflection property cannot be optimized cannot easily be induced. Furthermore, since these islands 50 are arranged at random, light interference attributed to regularity of a light scattering pattern is prevented and coloring of the reflected light can be reduced.

Figure 7:
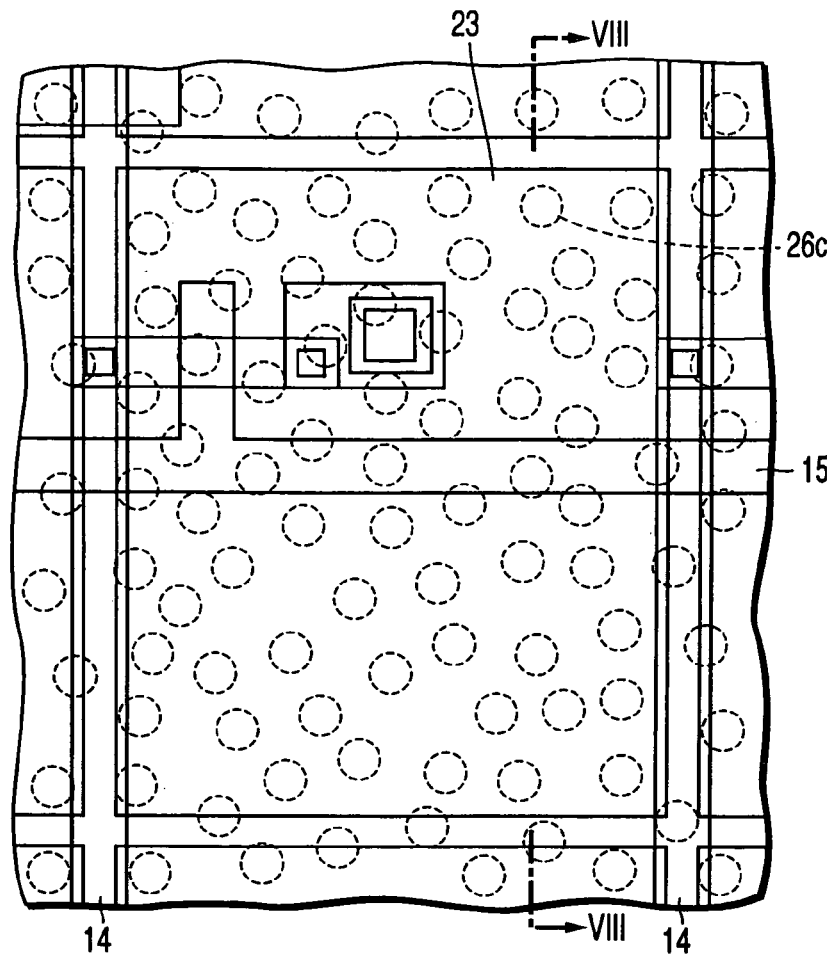
FIG. 7 is a diagram showing the plane structure in the vicinity of the pixel of the reflective liquid crystal display device according to a third embodiment of the present invention.
Figure 8:
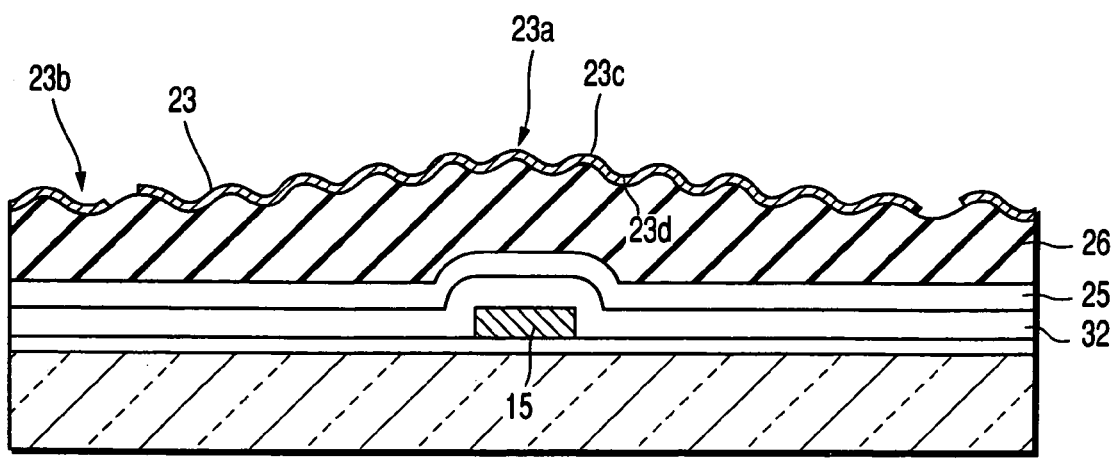
FIG. 8 is a diagram showing a sectional structure taken along line VIII-VIII shown in FIG. 7.

The reflective liquid crystal display device according to a third embodiment of the present invention will next be described. FIG. 7 shows the plane structure in the vicinity of the pixel of the reflective liquid crystal display device, and FIG. 8 shows a sectional structure taken along line VIII-VIII shown in FIG. 7. The liquid crystal display device is constituted similarly as the first embodiment except the following structure. Therefore, in FIGS. 7 and 8, the part similar to that of the first embodiment is denoted with the same reference numeral, and the description thereof is omitted.

In the liquid crystal display device, as shown in FIG. 7, each scanning line 15 is disposed to cross a middle of the reflective pixel electrode 23 below the corresponding reflective pixel electrode 23. When the scanning line 15 is coated with the successively formed interlayer insulating film 32, protective insulating film 25, and organic insulating film 26, the first molding undulation is obtained in the upper surface of the organic insulating film 26 depending upon the aforementioned constitution, and the reflective pixel electrode 23 is formed along the upper surface.

Thereby, the inclination angle of the first undulation of the reflective pixel electrode 23 is set depending upon the thickness of the scanning line 15. Moreover, the reflective surface of the reflective pixel electrode 23 is obtained in which the plurality of main scattering portions, that is, convex portions 23c are formed on the gradual inclined surface as shown in FIG. 8.

In the reflective liquid crystal display device of the third embodiment, similarly as the first embodiment, the alignment defect of liquid crystal can be prevented without deteriorating the satisfactory optical reflection property. Furthermore, since the scanning line 15 is not disposed between the reflective pixel electrodes 23, the light reflected by the surface of the scanning line 15 is suppressed, and the high-quality image having a high contrast can be displayed.

The reflective liquid crystal display device according to a fourth embodiment of the present invention will next be described. FIG. 9 shows manufacturing steps of the reflective liquid crystal display device. The liquid crystal display device is constituted similarly as the first embodiment except the following structure. Therefore, in FIG. 9, the part similar to that of the first embodiment is denoted with the same reference numeral, and the description thereof is omitted.

In the manufacturing of the array substrate 10, the glass plate, quartz plate, or the like is used as the insulating substrate 13, and the semiconductor layer 16 is formed by depositing, for example, amorphous silicon on the insulating substrate 13 in a thickness of about 50 nm by the CVD process, and patterning this layer by the photo-etching process.

Subsequently, the gate insulating film 17 is formed by depositing Siox on the semiconductor layer 16 and insulating substrate 13 in a thickness of the order of 100 nm to 150 nm by the CVD process.

Subsequently, the gate electrode 18 and scanning line 15 are integrally formed by depositing the single metal such as Ta, Cr, Al, Mo, W and Cu, or the deposited or alloy film of the metals on the gate insulating film 17 in a thickness of the order of 200 nm to 400 nm, and patterning the film by the photo-etching process. Thereafter, the impurity such as phosphorus is injected into the semiconductor layer 16 by the ion injecting or doping process using the gate electrode 18 as the mask. Here, phosphorus is accelerated, for example, at an acceleration voltage of 80 keV in an atmosphere of $PH_3/H_2$, and injected at a dosage of $5 \times 10^{15}$ atoms/cm$^2$, that is, at a high concentration. The impurity injected area is activated by annealing the semiconductor layer 16, and constitutes the source and drain of the thin film transistor 24.

Subsequently, the array substrate 10 is successively treated in the steps shown in FIGS. 9A to 9D. The steps shown in FIGS. 9A to 9D are similar to the steps shown in FIGS. 4A to 4D described in the first embodiment. Therefore, the difference of elevation of the order of 0.1 μm to 0.5 μm is generated in the upper surface of the organic insulating film 26 depending upon the thickness of the wiring materials such as the scanning line 15 and signal line 14. The convex portion 26a is disposed in the outer edge of each pixel area PX, that is, in the boundary with the adjacent pixel area, and the concave portion 26b is disposed to be surrounded by the convex portion 26a. Therefore, the dimension D1 of the concave portion 26b substantially agrees with the pixel pitch usually of the order of 20 µm to 400 µm.

Figure 9A:
FIGS. 9A to 9J are diagrams showing the manufacturing steps of the array substrate of the reflective liquid crystal display device according to a fourth embodiment of the present invention.
Figure 9B:
Figure 9C:
Figure 9D:
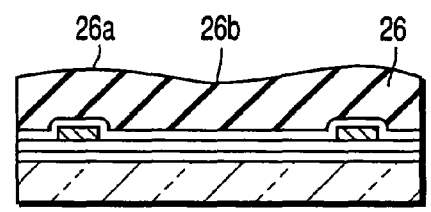
Figure 9E:
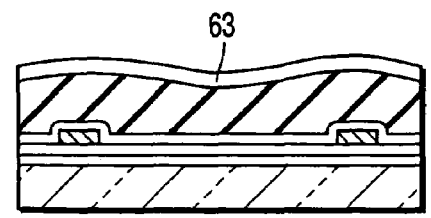

In the step shown in FIG. 9E, an organic insulating film 63 is formed by applying a photosensitive resin on the organic insulating film 26 in a thickness of 0.6 µm by the spin coating process, and pre-baking the array substrate 10.

Figure 9F:
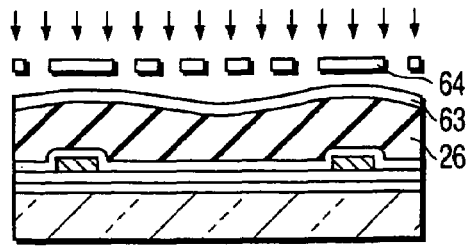

In the step shown in FIG. 9F, a photo mask 64 is used to expose the organic insulating film 63 in the range of the pixel area PX. The mask has a circular transmitting portion disposed at random such that the portion is prevented from overlapping with the signal line 14 and scanning line 15. Here, a diameter of the transmitting portion is set to be of the order of 2 µm to 20 µm, which is smaller than the dimension D1 of the concave portion 26b, and the exposure is set to a range of 50 mJ to 4000 mJ. The undulation of the organic insulating film 63, that is, the concave/convex shape and density can be controlled in accordance with the opening shape, the opening density of the photo mask 64, exposure, and the like.

Figure 9G:
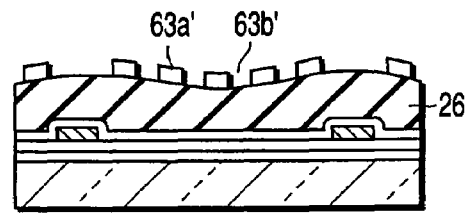

In the step shown in FIG. 9G, the organic insulating film 63 is developed in order to remove the aforementioned exposed portion from the organic insulating film 26, and thereby a plurality of micro circular concave portions 63b' and a convex portion 63a' surrounding these concave portions 63b' are formed.

Figure 9H:
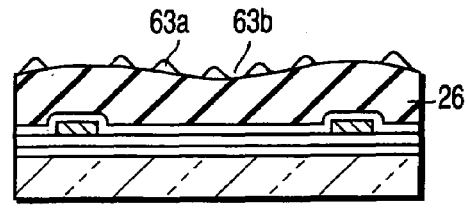

In the step shown in FIG. 9H, the heating treatment of the array substrate 10 is performed. This changes the concave portion 63b' and convex portion 63a' of the organic insulating film 63 to the chamfered smooth concave portion 63b and convex portion 63a surrounding the concave portion 63b.

Figure 9I:
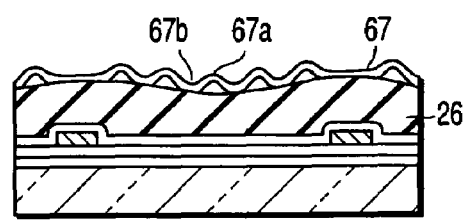

In the step shown in FIG. 9I, an organic insulating film 67 is formed by applying the photosensitive resin similar to the resin used in forming the organic insulating film 63 on the organic insulating film 26 in a thickness of 0.3 µm by the spin coating process so that the concave portion 63b and convex portion 63a are coated, and pre-baking the array substrate 10. Thereby, the second molding undulation is obtained in the organic insulating film 67. The second molding undulation is constituted by concave portions 67b and convex portions 67a surrounding these concave portions 67b.

Figure 9J:
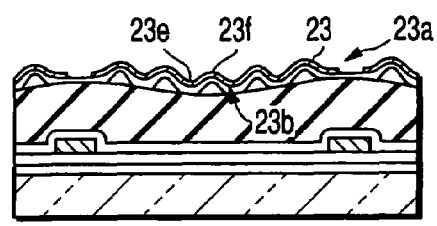
Figure 10:
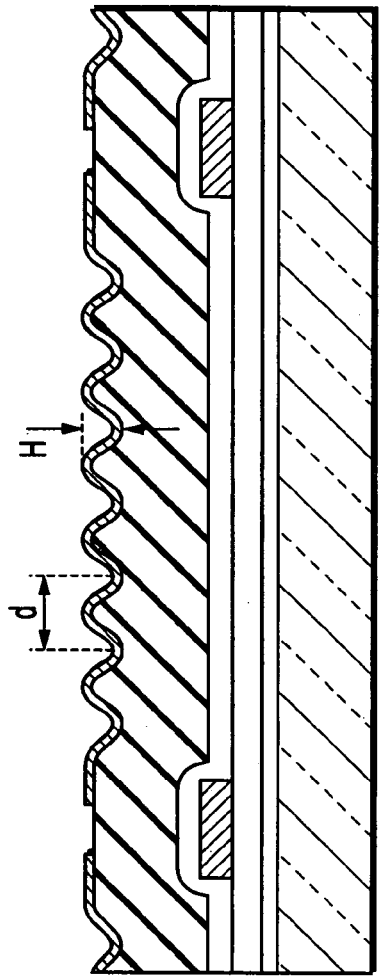
FIG. 10 is a diagram showing the sectional structure of a pixel peripheral surface of a conventional reflective liquid crystal display device.

In the step shown in FIG. 9J, a metal film of Al, Ni, Cr, Ag or the like is deposited on the organic insulating film 67 in a thickness of about 100 nm by the sputtering process, and patterned in the predetermined shape by the photo-etching process, and thereby the reflective pixel electrode 23 is formed.

In the reflective liquid crystal display device of the fourth embodiment, the reflective pixel electrode 23 constitutes the reflective plate, and the reflective surface has a state in which the first undulation having the difference of elevation H1 and second undulation having the difference of elevation H2 are superimposed. The first undulation is constituted of the convex portions 23a arranged along the outer edge in the range of each pixel area PX, and the concave portion 23b surrounded by the convex portion 23a. The second undulation is constituted of a plurality of hemispheric concave portions 23e arranged at random in the range of each pixel area PX, and convex portions 23f surrounding these concave portions 23e. That is, the first undulation is gradually depressed toward the vicinity of the middle from the outer edge in the range of each pixel area PX, and is formed by disposing the gradual inclined surface in the range of each pixel area PX. Moreover, the second undulation is depressed in the plurality of positions in the range of the pixel area PX, and is formed by disposing the plurality of main scattering portions in the range of each pixel area.

Even in this constitution, similarly as the first embodiment, the alignment defect of the liquid crystal can be prevented without deteriorating the satisfactory optical reflection property.

The liquid crystal display device according to a fifth embodiment of the present invention will next be described.

Figure 11:
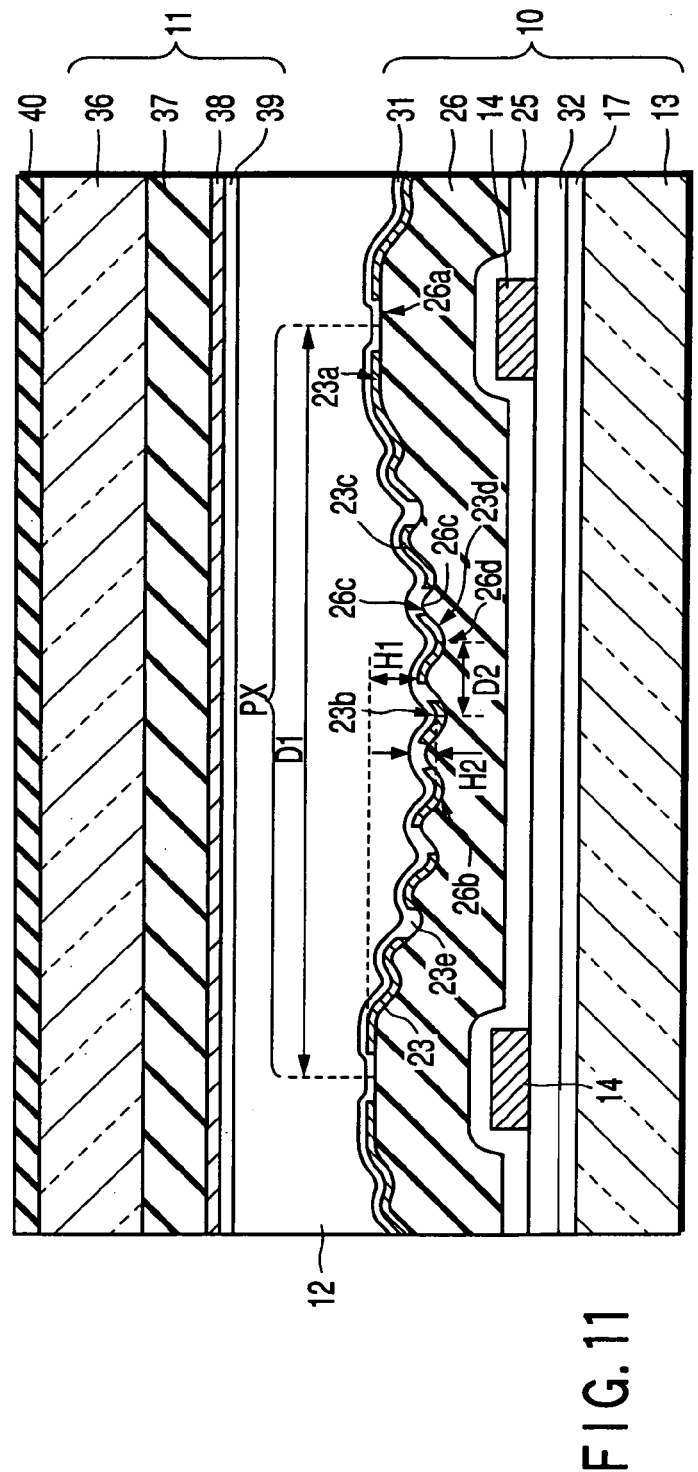
FIG. 11 is a diagram showing the sectional structure in the vicinity of the pixel of a semi-transmission type liquid crystal display device according to a fifth embodiment of the present invention.

FIG. 11 shows the sectional structure in the vicinity of the pixel of a semi-transmission type liquid crystal display device, FIG. 12 shows the plane structure in the vicinity of the pixel of the semi-transmission type liquid crystal display device, and FIG. 13 shows a sectional structure taken along line A-B shown in FIG. 12. The semi-transmission type liquid crystal display device includes the array substrate 10, counter substrate 11, and liquid crystal layer 12 held between these substrates 10 and 11. The semi-transmission type liquid crystal display device has a reflection function formed by the reflective plate for scattering the incident light via the counter substrate 11 and liquid crystal layer 12, and also has a transmission function for transmitting the incident light via the array substrate 10.

The array substrate 10 includes the insulating substrate 13, the plurality of reflective pixel electrodes 23 arranged in the matrix form, the plurality of signal lines 14 arranged along the row of these reflective pixel electrodes 23, the plurality of scanning lines 15 arranged along the line of these reflective pixel electrodes 23, the plurality of thin film transistors for pixels (TFT) 24 arranged as the switching elements in the vicinity of intersection positions of the corresponding scanning line 15 and signal line 14, and the alignment film 31 with which the plurality of reflective pixel electrodes 23 are coated.

The counter substrate 11 includes the insulating substrate 36 having permeability to light, the coloring layer 37 forming the color filter with which the insulating substrate 36 is coated, the transparent counter electrode 38 with which the coloring layer 37 is coated, and the alignment film 39 with which the counter electrode 38 is coated. Moreover, the polarization plate 40 is attached to the transparent insulating substrate 36 on the side opposite to the coloring layer 37.

The liquid crystal layer 12 is divided into the plurality of pixel areas PX for the plurality of reflective pixel electrodes 23. Each pixel area PX is disposed between two adjacent scanning lines 15 and two adjacent signal lines 14. Each thin film transistor 24 becomes conductive in response to the scanning pulse supplied from the corresponding scanning line 15, and supplies the potential of the corresponding signal line 14 to the corresponding reflective pixel electrode 23. Each reflective pixel electrode 23 applies the potential of the corresponding signal line 14 as the pixel potential to the corresponding pixel area PX of the liquid crystal layer 12, and controls the transmittance of the pixel area PX based on the difference between the pixel potential and the potential of the counter electrode 38.

In the array substrate 10, each TFT 24 includes the semiconductor layer 16 of amorphous silicon or polysilicon, the gate electrode 18 formed above the semiconductor layer 16 in the insulated manner and connected to the corresponding scanning line 15, and the source and drain electrodes 19, 20 which contact the source area 16S and drain area 16D of the semiconductor layer 16 via the contact holes 21, 22 on the opposite sides of the gate electrode 18 and which are connected to the corresponding reflective pixel electrode 23 and corresponding signal line 14, respectively.

The semiconductor layer 16 is formed on the insulating substrate 13, and coated with the gate insulating film 17 together with the insulating substrate 13. The gate electrode 18 is insulated from the semiconductor layer 16 by the gate insulating film 17, and integrally formed with the corresponding scanning line 15 on the gate insulating film 17. The gate electrode 18 and scanning line 15 as well as the gate insulating film 17 are coated with the interlayer insulating film 32.

The contact holes 21, 22 are formed in the interlayer insulating film 32 and gate insulating film 17 so that the source area 16S and drain area 16D formed in the semiconductor layer 16 are exposed on the opposite sides of the gate electrode 18. The source electrode 19 and drain electrode 20 are in contact with the source area 16S and drain area 16D of the semiconductor layer 16 in these contact holes 21, 22, respectively, and formed on the interlayer insulating film 32.

The source electrode 19 is integrally formed with the expansion source electrode 33 on the interlayer insulating film 32. The drain electrode 20 is integrally formed with the corresponding signal line 14 on the interlayer insulating film 32. The source electrode 19, expansion source electrode 33, drain electrode 20, and signal line 14, together with the interlayer insulating film 32, are coated with the protective insulating film 25.

The protective insulating film 25 has the contact hole 29 in which the expansion source electrode 33 is partially exposed, and is coated with the organic insulating film 26. The organic insulating film 26 has the contact hole 30 in which the expansion source electrode 33 is partially exposed, and the contact hole 30 is formed in the contact hole 29 of the protective insulating film 25. The reflective pixel electrode 23 contacts the expansion source electrode 33 in the contact holes 29, 30, and is formed on the organic insulating film 26 and coated with the alignment film 31.

The organic insulating film 26 has the upper surface in which the first molding undulation gradually depressed toward the vicinity of the middle from the outer edge in the range of each pixel area PX and the second molding undulation rising in the plurality of positions in the range of the pixel area PX are superimposed. That is, the first molding undulation is the gradual inclined surface, and is constituted of the convex portion 26a arranged along the outer edge in the range of the pixel area PX, and the concave portion 26b surrounded by the convex portion 26a. The second molding undulation is constituted of the plurality of hemispheric convex portions 26c arranged at random in the range of the pixel area PX, and concave portions 26d surrounding these convex portions 26c.

The reflective pixel electrode 23 functions as the reflective plate for scattering the light incident from the counter substrate 11 via the liquid crystal layer 12 at the high reflectance, contains materials such as silver, aluminum, and an alloy of these, and is formed in the predetermined thickness along the upper surface of the organic insulating film 26. Therefore, the reflective pixel electrode 23 is formed on the upper surface of the organic insulating film 26, and is defined to have the reflective surface in which the first undulation formed by disposing the gradual inclined surface in the range of the pixel area PX and the second undulation formed by disposing the plurality of main scattering portions in the range of the pixel area PX are superimposed.

Moreover, the reflective pixel electrode 23 has a hole for transmission 23e which can pass the incident light via the array substrate 10.

That is, the first undulation of the reflective pixel electrode 23 is constituted of the concave portion 23b corresponding to the concave portion 26b of the organic insulating film 26, and the convex portion 23a corresponding to the convex portion 26a of the organic insulating film 26. The second undulation of the reflective pixel electrode 23 is constituted of the convex portion 23c corresponding to the convex portion 26c of the organic insulating film 26, and the concave portion 23d corresponding to the concave portion 26d of the organic insulating film 26. The gradual inclined surface of the first undulation is obtained as the combination of the convex portion 23a and concave portion 23b. The main scattering portion of the second undulation is obtained as the convex portion 23c. In FIG. 11, H1 indicates the difference of elevation of the first undulation as the height of the convex portion 23a or the depth of the concave portion 23b, and H2 indicates the difference of elevation of the second undulation as the height of the convex portion 23c or the depth of the concave portion 23d.

Manufacturing steps of the aforementioned reflective liquid crystal display device will next be described.

FIGS. 14A to 14H show the manufacturing steps of the array substrate 10. In the manufacturing of the array substrate 10, the glass plate, quartz plate, or the like is used as the insulating substrate 13. The semiconductor layer 16 constituting a channel layer of the pixel TFT 24 is formed by depositing, for example, amorphous silicon on the insulating substrate 13 in a thickness of about 50 nm by the CVD process, and patterning this layer by the photo-etching process.

Subsequently, the gate insulating film 17 is formed by depositing SiOx on the semiconductor layer 16 and insulating substrate 13 in a thickness of the order of 100 nm to 150 nm by the CVD process.

Subsequently, the gate electrode 18 and scanning line 15 are integrally formed by depositing the single metal such as Ta, Cr, Al, Mo, W, and Cu, or the deposited or alloy film of the metals on the gate insulating film 17 in a thickness of the order of 200 nm to 400 nm, and patterning the film by the photo-etching process. Thereafter, the impurity such as phosphorus is injected into the semiconductor layer 16 by the ion injecting or doping process using the gate electrode 18 as the mask. Here, phosphorus is accelerated, for example, at an acceleration voltage of 80 keV in an atmosphere of $PH_3/H_2$, and injected at a dosage of $5 \times 10^5$ atoms/$cm^2$, that is, at the high concentration. The impurity injected area is activated by annealing the semiconductor layer 16, and constitutes the source area 16S and drain 16D of the thin film transistor 24.

Figure 14A:
FIGS. 14A to 14H are diagrams showing manufacturing steps of the array substrate shown in FIG. 1.

In the step shown in FIG. 14A, the interlayer insulating film 32 is formed by using, for example, the PECVD process to deposit SiOx on the gate electrode 18, scanning line 15, and gate oxide film 17 in a thickness of the order of 500 nm to 700 nm. The interlayer insulating film 32 is patterned by the photo-etching process so that the source area 16S and drain 16D of the semiconductor layer 16 are exposed, and thereby the contact holes 21 and 22 are formed.

Figure 14B:
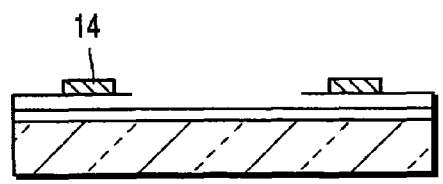

In the step shown in FIG. 14B, the single metal such as Ta, Cr, Al, Mo, W, and Cu, or the laminated or alloy film of the metals is deposited on the interlayer insulating film 32 in a thickness of the order of 500 nm to 700 nm, and patterned into the predetermined shape by the photo-etching process, so that wirings such as the signal line 14, source electrode 19, drain electrode 20, and expansion source electrode 33 are formed.

Figure 14F:
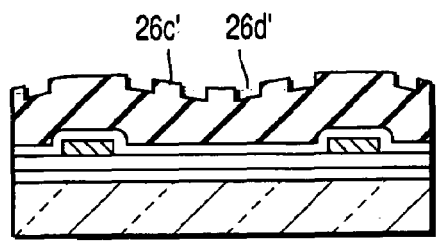
Figure 14C:
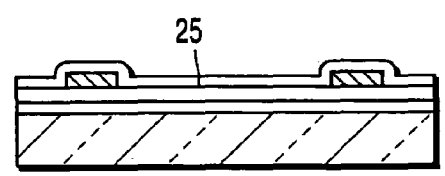

In the step shown in FIG. 14C, the transparent protective insulating film 25 is formed by depositing SiNx on these wirings and interlayer insulating film 32 by the PECVD process, and the contact hole 29 is formed by patterning the protective insulating film 25 by the photo-etching process.

Figure 14G:
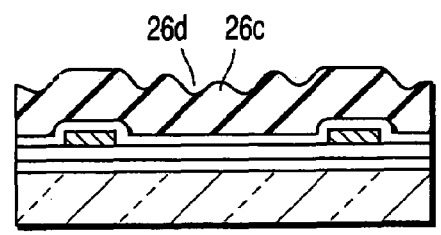
Figure 14D:
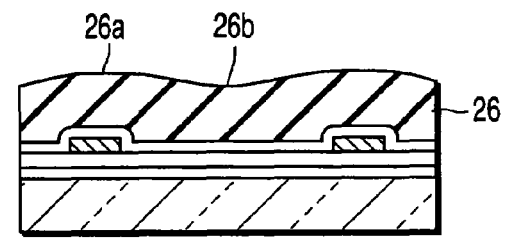

In the step shown in FIG. 14D, the organic insulating film 26 is formed by applying the positive photosensitive resin on the protective insulating film 25 in a thickness of the order of 1 μm to 4 μm by the spin coating process or the like, and further pre-baking the whole array substrate 10. When the viscosity and spin rotation number of the photosensitive resin are optimized, the first molding undulation of the convex portion 26a and concave portion 26b is formed in the range of the pixel area PX surrounded by the two adjacent signal lines 14 and two adjacent scanning lines 15. Concretely, the difference of elevation of the order of 0.1 μm to 0.5 μm is generated in the upper surface of the organic insulating film 26 depending upon the thickness of the wiring materials such as the scanning line 15 and signal line 14. The convex portion 26a is disposed in the outer edge of each pixel area PX, that is, in the boundary with the adjacent pixel area, and the concave portion 26b is disposed to be surrounded by the convex portion 26a. Therefore, the dimension D1 of the concave portion 26b substantially agrees with the pixel pitch usually of the order of 20 μm to 400 μm.

Figure 14H:
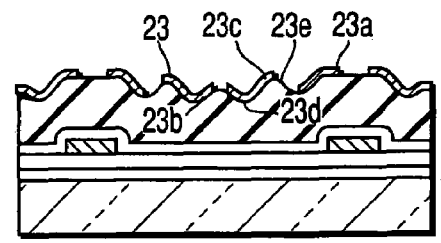
Figure 14E:
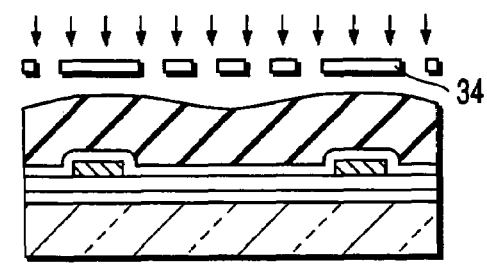

In the step shown in FIG. 14E, the first photo mask is used to partially expose the organic insulating film 26 in the range corresponding to the contact hole 29. The opening is made in the organic insulating film 26 in order to form the contact hole 30 in which the expansion source electrode 33 is exposed. Therefore, the exposure i is preferably of the order of 200 mJ to 1000 mJ.

Subsequently, the second photo mask 34 is used to expose the organic insulating film 26 in the range of the pixel area PX. The second photo mask has a circular shielding portion disposed at random such that the portion is prevented from overlapping with the signal line 14 and scanning line 15. Here, the diameter of the shielding portion is set to be of the order of 2 μm to 20 μm, which is smaller than the dimension Dl of the concave portion 26b, and the luminous exposure is set to a range of 10 mJ to 200 mJ. The undulation of the organic insulating film 26, that is, the concave/convex shape and density can be controlled in accordance with the opening shape, the opening density of the photo mask 34, luminous exposure, and the like.

In the step shown in FIG. 14F, the organic insulating film 26 is developed in order to remove the aforementioned exposed portion, and thereby the plurality of convex portions 26c' and concave portions 26d' are formed in the organic insulating film 26 together with the contact hole 30. Additionally, in the exposure using the second photo mask 34, the exposure is in the range of 10 to 200 mJ. Therefore, the bottom of the concave portion 26d' does not reach the protective insulating film 25 as the substrate of the organic insulating film 26, and remains in the vicinity of the upper surface of the organic insulating film 26.

In the step shown in FIG. 14G, the heating treatment of the array substrate 10 is performed. This changes the convex portion 26c' and concave portion 26d' of the organic insulating film 26 to the chamfered smoothly hemispheric convex portion 26c and the concave portion 26d surrounding the convex portion 26c, and the second molding undulation is formed. The diameter D2 of the convex portion 26c is set to be smaller than the dimension D1 of the concave portion 26b in accordance with the diameter of the shielding portion.

In the step shown in FIG. 14H, the metal film of Al, Ni, Cr, Ag or the like is deposited on the organic insulating film 26 in a thickness of about 100 nm by the sputtering process, and patterned into the predetermined shape by the photo-etching process, and thereby the reflective pixel electrode 23 is formed. In this case, the hole for transmission 23e is simultaneously formed in a part of the reflective pixel electrode 23.

In the manufacturing of the counter substrate 11, the glass plate, quartz plate, or the like is used as the insulating substrate 36 permeable to light, and the coloring layer 37 with the pigment, and the like dispersed therein is formed on the insulating substrate 36. The transparent counter electrode 38 is formed by depositing, for example, ITO on the coloring layer 37 by the sputtering process.

The array substrate 10 and counter substrate 11 are integrally formed after the alignment films 31 and 39 are formed. The alignment film 31 is formed by applying low-temperature cure type polyimide by printing so that the reflective pixel electrode 23 and organic insulating film 26 are coated, and performing the rubbing treatment. Moreover, the alignment film 39 is formed by applying low-temperature cure type polyimide by printing so that the transparent counter electrode 38 is coated, and performing the rubbing treatment.

The array substrate 10 and counter substrate 11 are obtained as described above, and disposed opposite to each other, while the alignment films 31 and 39 are disposed inside. These substrates are attached to each other via the peripheral edge seal material at the predetermined interval. The liquid crystal layer 12 is obtained by forming the liquid crystal injected space surrounded by the peripheral edge seal material into the cell between the array substrate 10 and the counter substrate 11, and injecting and sealing the liquid crystal composition such as the nematic liquid crystal into the cell. The polarization plate 40 is attached to the transparent insulating substrate 36 on the side opposite to the coloring layer 37, while the liquid crystal layer 12 is held between the array substrate 10 and the counter substrate 11. The semi-transmission type liquid crystal display device is completed as described above.

In the semi-transmission liquid crystal display device according to the fifth embodiment, the reflective pixel electrode 23 constitutes the reflective plate, and the reflective surface has a state in which the first undulation having the difference of elevation H1 and the second undulation having the difference of elevation H2 are superimposed. The first undulation is constituted of the convex portion 23a disposed along the outer edge in the range of the pixel area PX, and the concave portion 23b surrounded by the convex portion 23a. The second undulation is constituted of the plurality of hemispheric convex portions 23c arranged at random in the range of the pixel area PX, and the concave portion 23d surrounding these convex portions 23c.

That is, the first undulation is gradually depressed toward the vicinity of the middle from the outer edge in the range of each pixel area PX, and is formed by disposing the gradual inclined surface in each pixel area PX. Moreover, the second undulation rises in the plurality of positions in the range of the pixel area PX, and is formed by disposing the plurality of main scattering portions in each pixel area PX.

A reflected light on the reflective surface is scattered by the inclination angle obtained by superimposing the inclination angle obtained by the second undulation upon the inclination angle obtained by the first undulation. Therefore, even when the inclination angle obtained by the second undulation is small, the optimum reflection property can be obtained. On the other hand, the difference of elevation in the micro range can be set to the value sufficiently smaller than the conventional value, such as H2. Therefore, the liquid crystal alignment defect attributed to the difference of elevation can be prevented. As a result, the semi-transmission type liquid crystal display device can display the high-quality image having the broad angle of field of view and high contrast.

In the fifth embodiment, the second undulation is not disposed in the space between the reflective pixel electrodes 23. This does not substantially cause deterioration of the reflection property of the reflective surface, and additionally the second molding undulation on the side of the organic insulating film 26 can be obviated in the range of the space. Therefore, the patterning defect is not generated during patterning of the metal film deposited using the organic insulating film 26 as the substrate in the step of forming the reflective pixel electrode 23, and the point defect by the short-circuit between the pixel electrodes 23 can be reduced. Moreover, the second molding undulation is disposed so that the undulation is prevented from overlapping with the scanning line 15 and signal line 14. Therefore, the parasitic capacity between the scanning line 15 and the pixel electrode 23 and between the signal line 14 and the pixel electrode 23 can be reduced. Therefore, the display quality can be prevented from being deteriorated by cross talk, or the like.

The semi-transmission type liquid crystal display device according to a sixth embodiment of the present invention will next be described.

Figure 15:
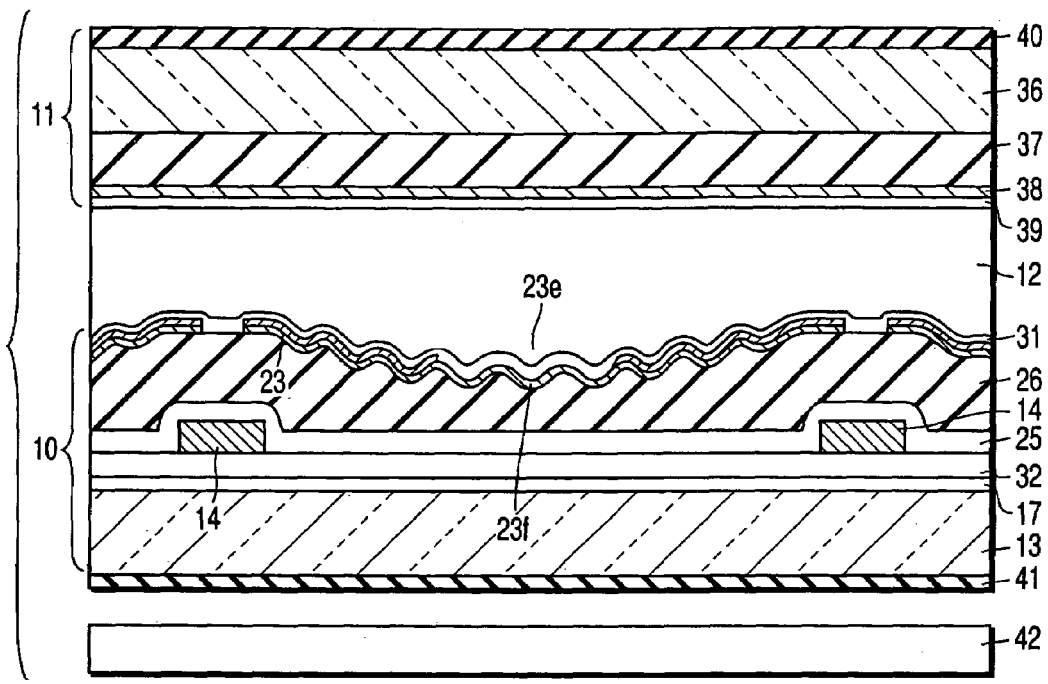
FIG. 15 is a diagram showing the sectional structure in the vicinity of the pixel of the semi-transmission type liquid crystal display device according to a sixth embodiment of the present invention.

FIG. 15 shows the sectional structure of the semi-transmission type liquid crystal display device. The semi-transmission type liquid crystal display device is constituted similarly as the fifth embodiment excluding the following structure. Therefore, in FIG. 15, a part similar to that of the fifth embodiment is denoted with the same reference numeral, and the description thereof is omitted.

As shown in FIG. 15, in this semi-transmission type liquid crystal display device, a transparent pixel electrode 23$f$ formed by a transparent conductive member such as ITO is disposed in an area corresponding to the hole for transmission 23$e$ of the reflective pixel electrode 23. The organic insulating film 26 having concave/convex is disposed as the substrate in the area corresponding to the hole for transmission 23$e$, and the transparent pixel electrode 23$f$ is disposed on the organic insulating film 26.

Moreover, the semi-transmission type liquid crystal display device includes a back light unit 42 for lighting from a side of the array substrate 10. Furthermore, the semi-transmission type liquid crystal display device includes a polarization plate 41 on the surface of the array substrate 10 disposed opposite to the back light unit 42. For example, the polarization plate 41 is disposed such that a polarization surface crosses at right angles to the polarization plate 40 disposed on the counter substrate 11.

When this semi-transmission type liquid crystal display device is utilized as a reflective type, similarly as the aforementioned embodiments, the external light incident via the counter substrate 11 and liquid crystal layer 12 is reflected by the reflective electrode 23, and selectively emitted from the counter substrate 11, and an image is displayed.

Moreover, when this semi-transmission type liquid crystal display device is utilized as a transmission type, a back light incident from the back light unit 42 via the array substrate 10 is selectively emitted from the counter substrate 11 via the hole for transmission 23$e$, and the image is displayed.

The semi-transmission type liquid crystal display device is manufactured as follows. That is, similarly as the first embodiment, after the steps shown in FIGS. 14A to 14G are performed, a transparent conductive film, for example, of ITO is formed on the organic insulating film 26 in a thickness of about 100 nm by the sputtering process, and patterned into the predetermined shape by the photo-etching process, so that the transparent pixel electrode 23$f$ is formed. Thereafter, as shown in FIG. 14H, the reflective pixel electrode 23 having the hole for transmission 23$e$ is formed. The subsequent steps are similar to those of the fifth embodiment.

Even in the semi-transmission type liquid crystal display device constituted as described above, the effect similar to that of the fifth embodiment is obtained. Moreover, when the display device is utilized as the transmission type, an electric field acting on the liquid crystal layer 12 is raised in a transmission area in the vicinity of the hole for transmission 23$e$. That is, as compared with the fifth embodiment, the electric field between the transparent pixel electrode 23$f$ and the counter electrode 38 directly acts on the liquid crystal layer 12, because the transparent pixel electrode 23$f$ is disposed opposite to the hole for transmission 23$e$. Therefore, when the display device is utilized as the transmission type, the contrast is increased, and it is possible to obtain a satisfactory liquid crystal display device having a satisfactory display quality.

The semi-transmission type liquid crystal display device according to a seventh embodiment will next be described.

Figure 16:
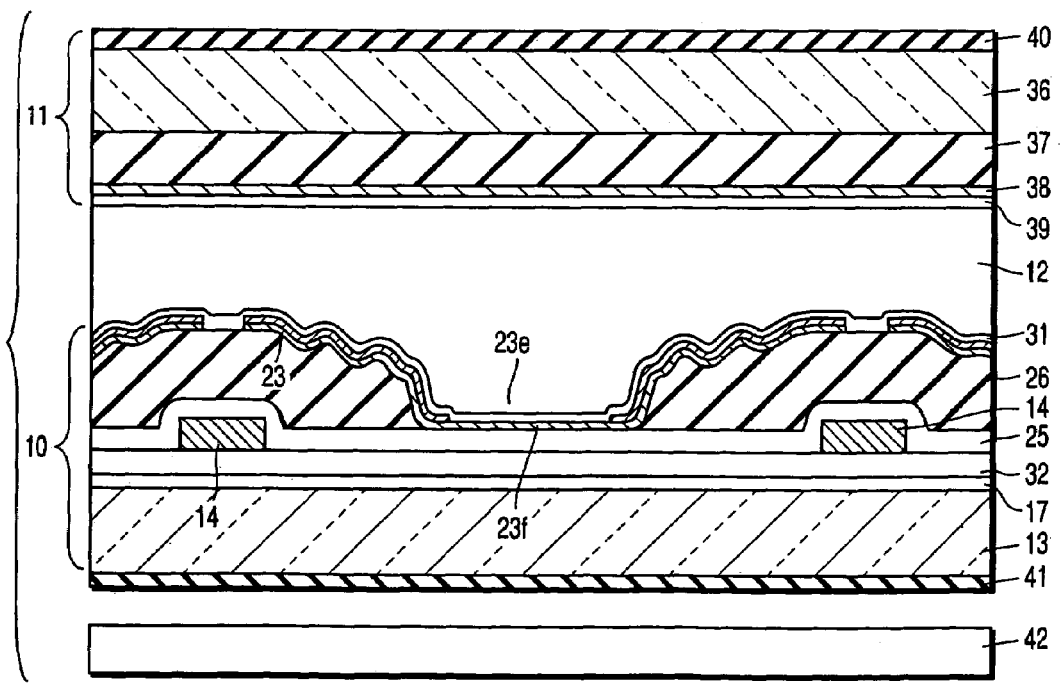
FIG. 16 is a diagram showing the sectional structure in the vicinity of the pixel of the semi-transmission type liquid crystal display device according to a seventh embodiment of the present invention.

FIG. 16 shows the sectional structure of the semi-transmission type liquid crystal display device. The semi-transmission type liquid crystal display device is constituted similarly as the sixth embodiment shown in FIG. 15 excluding the following structure. Therefore, in FIG. 16, a part similar to that of the sixth embodiment is denoted with the same reference numeral, and the description thereof is omitted.

In the semi-transmission type liquid crystal display device, as shown in FIG. 16, the transparent pixel electrode 23$f$ formed by the transparent conductive member such as ITO is disposed in the area corresponding to the hole for transmission 23$e$ of the reflective pixel electrode 23. The organic insulating film 26 having concave/convex is removed, and the flatted protective insulating film 25 is disposed as the substrate in the area corresponding to the hole for transmission 23$e$. The transparent pixel electrode 23$f$ is disposed on the protective insulating film 25.

Moreover, the semi-transmission type liquid crystal display device includes the back light unit 42 for lighting from the side of the array substrate 10. Furthermore, the semi-transmission type liquid crystal display device includes the polarization plate 41 on the surface of the array substrate 10 disposed opposite to the back light unit 42. For example, the polarization plate 41 is disposed such that the polarization surface crosses at right angles to the polarization plate 40 disposed on the opposite substrate 11.

The semi-transmission type liquid crystal display device is manufactured as follows. That is, similarly as the first embodiment, after the steps shown in FIGS. 14A to 14G are performed, a part of the organic insulating film 26 is removed by the photo-etching process and a part of the protective insulating film 25 is exposed. Subsequently, the transparent conductive film, for example, of ITO is formed on the organic insulating film 26 and protective insulating film 25 in a thickness of about 100 nm by the sputtering process, and patterned into the predetermined shape by the photo-etching process, so that the transparent pixel electrode 23$f$ is formed. Thereafter, as shown in FIG. 14H, the reflective pixel electrode 23 having the hole for transmission 23e is formed in the area from which the organic insulating film 26 is removed. The subsequent steps are similar to those of the fifth embodiment.

Even in the semi-transmission type liquid crystal display device constituted as described above, the effect similar to that of the fifth embodiment is obtained. Moreover, the thickness of each liquid crystal layer 12 in the transmission and reflective areas can independently be controlled. Therefore, when the display device is utilized as the transmission or reflective type, an optical condition can be optimized. In each case, it is possible to obtain the satisfactory liquid crystal display device having the satisfactory display quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A liquid crystal display device comprising: first and second electrode substrates; and a liquid crystal layer which is held between said first and second electrode substrates and whose liquid crystal molecular arrangement is divided into a plurality of pixel areas controlled by said first and second electrode substrates, wherein said first electrode substrate includes an area in which a reflective plate for scattering a light incident via said second electrode substrate and said liquid crystal layer is formed and which has a reflection function, and an area having a transmission function for transmitting the light incident via said first electrode substrate, and said reflective plate has a reflective surface including a plurality of convex portions located in the pixel areas, the convex portions have tip ends that are different in elevation, and an elevation difference of the tip ends varies in a cycle greater than a pitch of the convex portions.

2. The liquid crystal display device according to claim 1, wherein the area having said transmission function has a hole for transmission in said reflective plate.

3. The liquid crystal display device according to claim 1, wherein an area having said transmission function has a plurality of transparent electrodes for applying a pixel potential to each corresponding pixel area.

4. The liquid crystal display device according to claim 3, wherein said transparent electrode is disposed on an insulating layer having concave portions and convex portions.

5. The liquid crystal display device according to claim 4, wherein said insulating layer includes an organic insulating layer which defines said reflective surface.

6. The liquid crystal display device according to claim 5, wherein said organic insulating layer is constituted of a photosensitive resin.

7. The liquid crystal display device according to claim 3, wherein said transparent electrode is disposed on a flatted insulating layer.

8. The liquid crystal display device according to claim 7, wherein said insulating layer includes an organic insulating layer, and an inorganic insulating layer as a substrate of the organic insulating layer, and said transparent electrode is disposed on the inorganic insulating layer.

* * * * *